United States Patent [19]

Vehmas et al.

[11] Patent Number: 5,057,138

[45] Date of Patent: Oct. 15, 1991

[54] METHOD AND APPARATUS FOR PREVENTING THE ARCHING OF GLASS SHEETS IN THE ROLLER-EQUIPPED FURNACE OF A HORIZONTAL TEMPERING PLANT

[75] Inventors: Jukka H. Vehmas, Tampere; Esko O. Lehto, Kangasala, both of Finland

[73] Assignee: Tamglass Oy, Tampere, Finland

[21] Appl. No.: 568,052

[22] Filed: Aug. 16, 1990

[30] Foreign Application Priority Data

Sep. 6, 1989 [FI] Finland .................................. 894191

[51] Int. Cl.[5] .......................................... C03B 27/044
[52] U.S. Cl. ........................................ 65/111; 65/114; 65/349; 65/350
[58] Field of Search ................. 65/111, 114, 119, 349, 65/350

[56] References Cited

U.S. PATENT DOCUMENTS

| 3,326,654 | 6/1967 | Plumat | 65/350 |
| 4,390,359 | 6/1983 | Reunamaki | 65/114 |
| 4,620,864 | 11/1986 | McMaster | 65/114 |

FOREIGN PATENT DOCUMENTS

| 73515 | 6/1976 | Japan | 65/119 |

Primary Examiner—Joye L. Woodard
Attorney, Agent, or Firm—Burns, Doane, Swecker & Mathis

[57] ABSTRACT

The invention relates to a method and apparatus for preventing the arching of glass sheets in the roller-equipped furnace of a horizontal tempering plant. In order to equalize the total thermal effect applied to the top and bottom surfaces of a glass sheet, the top surface of a glass sheet is subjected at least at the initial stage of a heating cycle to an intensified convection heat effect by blasting air into the furnace through blasting pipes (3) positioned adjacent to the top surface of a glass sheet. An object of this blasting is to compensate a vigorous heat transfer caused by hot rollers to the bottom surface of a glass sheet in the beginning of a heating cycle. In order to intensify a heat equalization between the opposite surfaces of a glass sheet, the furnace space below a glass sheet is cooled by passing the air to be blown into the furnace into a blasting manifold (3) through a heat-exchange manifold (6) positioned below a bearing surface formed by rollers (2). The air cooling the space below a glass sheet and rollers (2) is preheated and, thus, can be used more effectively for intensifying the convection heat effect on the top surface of a glass sheet.

11 Claims, 1 Drawing Sheet

METHOD AND APPARATUS FOR PREVENTING THE ARCHING OF GLASS SHEETS IN THE ROLLER-EQUIPPED FURNACE OF A HORIZONTAL TEMPERING PLANT

BACKGROUND OF THE INVENTION

The present invention relates to a method for preventing the arching of glass sheets in the roller-equipped furnace of a horizontal tempering plant, in which method the glass sheets are carried in a horizontal plane by means of a conveyor consisting of horizontal rollers through a furnace, the opposite surfaces of a glass sheet being subjected to a conduction, convection and radiation heat effect generated by resistance elements, rollers or the like furnace components fitted above and below a glass sheet whereby, in order to equalize the total thermal effect applied to the top and bottom surfaces of a glass sheet, the top surface is subjected at least at the initial stage of a heating cycle to an intensified convection heat effect by blasting air into the furnace adjacent to the top surface of a glass sheet as narrow jets which through an injector effect produce a turbulent flow for the hot air contained in the furnace along the top surface of a glass sheet.

The invention relates also to an apparatus for preventing the arching of glass sheets in the roller-equipped furnace of a horizontal tempering plant, said apparatus comprising a furnace, heating resistances therein for maintaining the furnace temperature close to a glass softening temperature, horizontal rollers inside the furnace for supporting a horizontal glass sheet and providing a conveyor therefor, as well as a blasting manifold above a bearing surface formed by the rollers for blowing the heat-equalizing air into the furnace.

This type of method and apparatus are disclosed in the Applicants' U.S. Pat. No. 4,390,359. This method has proved highly effective for eliminating a serious problem, namely that at various stages of heating the top and bottom surfaces of a glass sheet are subjected to different heat effects which, at the initial stage of heating, tend to arch a glass sheet in a manner that the edges rise upwards and at the final stage of heating the direction is reversed. This is particularly due to the fact that a cold glass sheet advances into a furnace and onto hot rollers which initially deliver heat rapidly to the bottom surface of a glass sheet but towards the end of a heating cycle the temperature of a glass sheet approaches the temperature of rollers to increase the proportional share of the amount of heat delivered to the top surface of a glass sheet. Thus, this problem has been substantially alleviated by means of a heat-equalizing blast known from U.S. Pat. No. 4,390,359.

It has been discovered, however, that this prior known method and apparatus has not in every case provided a sufficient heat transfer above the glass. Particularly, at the very beginning of a heating cycle, a more effective compensation should be accomplished to the heating between bottom and top surfaces.

OBJECTS AND SUMMARY OF THE INVENTION

An object of this invention is to develop this heat-compensation system further to make it more effective. A particular object of the invention is to provide a more effective heat-equalizing method and apparatus which is structurally simple and does not require the use of additional energy.

This object is achieved by a method and apparatus of the invention whose characterizing features are set forth in the claims.

BRIEF DESCRIPTION OF THE DRAWINGS

One embodiment of the invention will now be described in more detail with reference made to the accompanying drawings, in which.

DESCRIPTION

Figure 1:
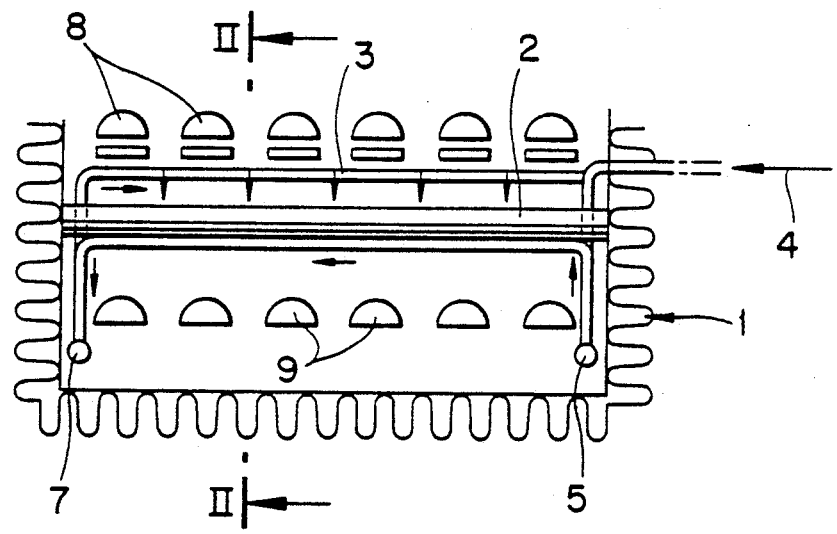
FIG. 1 shows a schematic cross-section of a furnace fitted with an apparatus for carrying out a method of the invention and FIG. 2 shows a longitudinal section of a section of the furnace shown in FIG. 1.

Inside a furnace 1 above the glass-bearing plane formed by rollers 2 are fitted compressed-air pipes 3 made of heat-resisting steel. Pipes 3 are mounted transversely to the glass-advancing direction, i.e. parallel to rollers 2. Each transverse compressed-air pipe 3 is provided with orifices having a diameter of circa 1 mm arranged horizontally or slightly inclined downwards in both directions at appr. 100 mm spacings. The blast pressure in pipes 3 is appr. 3-5 bars. The narrow air jets discharging through the orifices of pipes 3 generate a turbulent flow of the air in the furnace along the top surface of a glass sheet. This in turn intensifies the transfer of heat through a convection heat effect to the top surface of glass.

However, the supply of compressed air indicated by an arrow 4 is not effected directly into pipes 3 but, instead, into a distributing pipe 5, extending lengthwise of the furnace and having connected therewith a plurality of tubes 6 which are positioned below the bearing surface formed by rollers 2 at every other roller spacing. By way of tubes 6 the air travels into a manifold 7 having blasting pipes 3 connected therewith. Upon passing through tubes 6 the air is preheated and, at the same time, it cools rollers 2 and the space below a glass sheet.

In addition, the furnace 1 is conventionally provided with upper heating resistances 8 and lower heating resistances 9. Pipes 3 and tubes 6 are positioned between resistances 8, 9 and rollers 2. Pipes and tubes 3 and 6 are located as close to the rollers as possible and have a small mass, which means that they themselves do not have a significant effect on the thermal equilibrium of a furnace but, during a blasting operation, they are capable of effectively and momentarily reducing heat transfer to the bottom surface and of increasing it to the top surface.

By virtue of the lower-side cooling, the amount of blasting air required is considerably less than before. The total heating time can also be cut down as a result of the invention.

The efficiency of the invention was verified by running three tests whose procedure and results will be explained next.

Test 1

This test only involved an upper blasting manifold (see table 1), wherein the orifices were positioned at the mid-points of resistance elements 8 in order to make the blasting air hotter with a resistance glowing directly above the orifices. However, the arrangement did not achieve a perceptible improvement over a prior art manifold which had fewer orifices disposed at the intermediate points between resistances.

Test 2

In this test, the orifice pitch was maintained the same as in test 1 but the orifices were enlarged from 1.4 mm to 1.7 mm. Test glass was the same quality as in the first test. Also blast pressures and furnace temperatures were the same (see table 1). In the test, it was necessary in increase the heating time from 172 seconds to 182 seconds. The reason for this was the increase of the amount of used blasting air, whereby the furnace began to cool and the heating time had to be increased to reach the same glass discharge temperature.

Test 3

Figure 2:
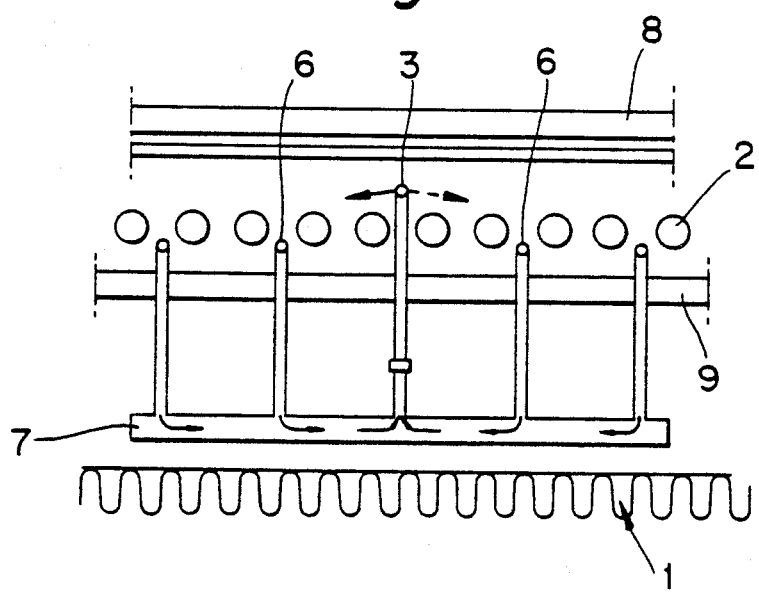

This test involved the arrangement of the invention shown in FIGS. 1 and 2. The blasting manifold had the same orifice pitch as a prior known manifold (orifices between the resistances). The size of orifices was 1 mm and the number of orifices was 25.

The test revealed that the pressure of blasting air could be dropped to 3,5 bars and nevertheless the furnace temperature could be maintained 5°–10° lower than before. Heating time became about 15 seconds shorter than in the 1st test. If the furnace temperature was to be maintained the same as in tests 1 and 2, the estimated heating time would be 20-30 seconds shorter. However, this was not done as the furnace was more readily controllable at a lower temperature.

The test parameters and results are collectively shown in the following table.

TABLE 1

|  | Test 1 | Test 2 | Test 3 |
| --- | --- | --- | --- |
| Orifice size, mm | 1.4 | 1.7 | 1.0 |
| Number of orifices | 30 | 30 | 25 |
| Blast pressure (bar) | 4.5 | 4.5 | 3.5 |
| Air consumption (proportional) | 3 | 4.5 | 1 |
| Furnace temperature (°C.) | | | |
| Top | 710 720 | 710 720 | 705 710 |
| Bottom | 710 720 | 710 720 | 675 685 |
| Heating time (s) | 172 | 182 | 155 |

It could be visually evaluated that test 3 produced glass of a superior optical quality compared to the other tests.

The tests revealed clearly that the addition of blasting air does not provide any major regards. On the contrary, problems began to pop up elsewhere: Prolongation of heating time and effluence of heat detrimentally for the structures. Neither did the changing of orifice pitch produce any significant improvement.

The third test, which involved the use of an apparatus of the invention, provided the following perceptible benefits: an improved optical quality of glass, considerably less blasting air required resulting in a possibility of shortening of the heating time.

When testing an apparatus of the invention, it could be verified that, by increasing the blast pressure, the heat equalizing action became even too effective. This means that the upper-side heat transfer could even be brought to exceed that of the lower side. However, this quality makes a method and apparatus of the invention applicable also in heating furnaces intended for less controllable, coated glasses.

We claim:

1. A method of preventing arching of a glass sheet in a furnace of a glass tempering apparatus comprising the steps of:
   supporting a glass sheet on a substantially horizontal conveyor in said furnace, said conveyor including a plurality of rollers;
   heating top and bottom surfaces of said glass sheet with conduction, convection and radiation heat generated at least by a plurality of resistance elements and said rollers, said resistance elements being variously disposed above and below said glass sheet;
   cooling a furnace space below said rollers by transferring heat generated at said furnace space to air so as to preheat said air;
   blasting said preheated air toward said top surface of said glass sheet from a location adjacent the top surface so as to subject said top surface to a convection heat effect that substantially equalizes a total thermal heating effect at both said top and bottom surfaces; and,
   blasting said preheated air toward said top surface through jets such that an injector effect of said jets produces a turbulent flow of said preheated air along said top surface of said glass sheet.

2. A method of preventing arching of a glass sheet as set forth in claim 1, wherein said furnace space is cooled by circulating said air through heat-exchange tubes disposed in said furnace space.

3. A method of preventing arching of a glass sheet as set forth in claim 1, wherein during cooling of said furnace space and preheating of said air, said air is passed through a heat-exchange manifold disposed below said rollers and into a blasting manifold disposed above said rollers.

4. An apparatus for preventing arching of a glass sheet in a glass tempering device comprising:
   a furnace;
   heating means for maintaining a glass softening temperature in said furnace;
   a plurality of rollers for supporting and conveying a glass sheet, said rollers being disposed substantially horizontally in said furnace;
   blasting manifold means for blowing heated air into said furnace, said blasting manifold means being disposed above said rollers; and,
   cooling manifold means for circulating a cooling medium below said rollers such that a space below said rollers is cooled and air for said blasting manifold is heated, said cooling manifold means being disposed below said rollers.

5. A method of preventing arching of a glass sheet as set forth in claim 4, wherein said blasting manifold means and said cooling manifold means are in fluid communication with each other such that said cooling medium is air that is heated for blowing into said furnace by said blasting manifold means.

6. A method of preventing arching of a glass sheet as set forth in claim 4, wherein said cooling manifold means includes a plurality of cooling tubes positioned transverse to a conveying direction of said glass sheet, said plurality of tubes being variously disposed between adjacent rollers.

7. A method of preventing arching of a glass sheet as set forth in claim 6, wherein said blasting manifold means includes at least one blasting pipe positioned above said rollers transverse to a conveying direction of said glass sheet, said at least one blasting pipe having a plurality of perforations through which said heated air is blasted, said at least one blasting pipe being in fluid communication with a pipe manifold, said pipe manifold being positioned beneath said rollers and extending in a direction parallel to said conveying direction, said pipe manifold also being in fluid communication with said cooling pipes for receiving said heated air.

8. A method of preventing arching of a glass sheet as set forth in claim 6, wherein said cooling tubes are positioned in alternate spaces between said rollers.

9. A method of preventing arching of a glass sheet as set forth in claim 5, wherein said cooling manifold means includes a plurality of cooling tubes positioned transverse to a conveying direction of said glass sheet, said plurality of tubes being variously disposed between adjacent rollers.

10. A method of preventing arching of a glass sheet as set forth in claim 9, wherein said blasting manifold means includes at least one blasting pipe positioned above said rollers transverse to a conveying direction of said glass sheet, said at least one blasting pipe having a plurality of perforations through which said heated air is blasted, said at least one blasting pipe being in fluid communication with a pipe manifold, said pipe manifold being positioned beneath said rollers and extending in a direction parallel to said conveying direction, said pipe manifold also being in fluid communication with said cooling pipes for receiving said heated air.

11. A method of preventing arching of a glass sheet as set forth in claim 9, wherein said cooling tubes are positioned in alternate spaces between said rollers.

* * * * *